March 2, 1948.  W. J. MATTOX  2,436,932
PRODUCTION OF POLYCYCLIC HYDROCARBONS
Filed April 25, 1945
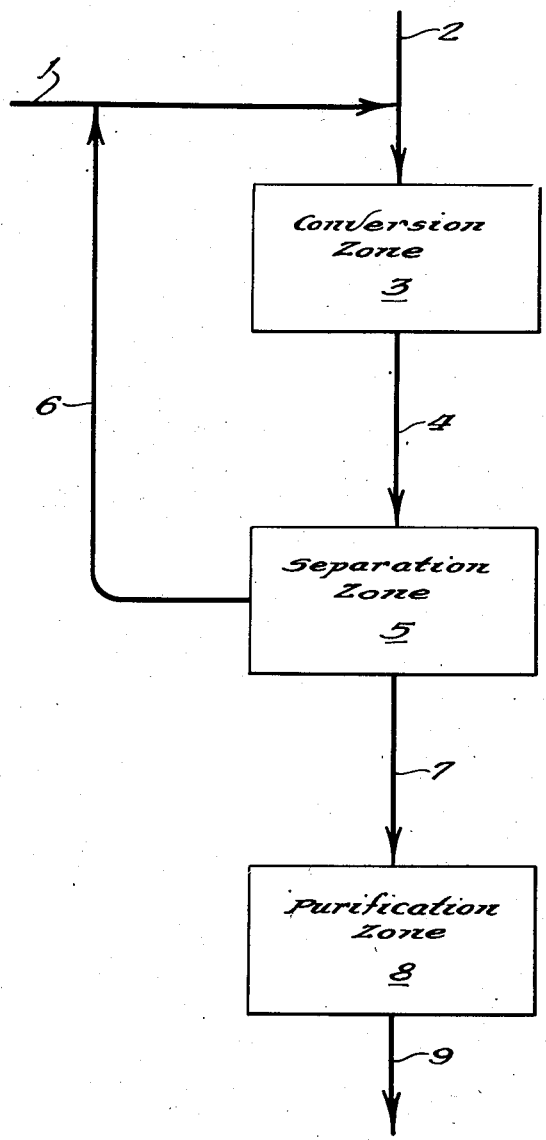
Inventor:
William J. Mattox
By: Lee J. Gary
Attorney.

Patented Mar. 2, 1948

2,436,932

UNITED STATES PATENT OFFICE 2,436,932

PRODUCTION OF POLYCYCLIC HYDROCARBONS

William J. Mattox, La Grange, Ill., assignor to Universal Oil Products Company, Chicago, Ill., a corporation of Delaware Application April 25, 1945, Serial No. 590,213

4 Claims. (Cl. 260—668)

This application is a continuation-in-part of my abandoned copending application Serial No. 496,450, filed July 28, 1943.

This invention relates to a process for manufacturing a polycyclic aromatic hydrocarbon and more particularly for manufacturing naphthalene.

An object of this invention is to produce a naphthalene hydrocarbon.

A further object of this invention is to treat ethylene and benzene or ethylbenzene at a conversion temperature in the presence of a synthetically prepared silica base catalyst.

One specific embodiment of the present invention relates to a process for producing naphthalene which comprises reacting benzene and ethylene at a temperature of from about 525° to about 700° C. in the presence of a synthetically prepared catalyst comprising silica and a member selected from the group consisting of alumina, thoria, and zirconia.

A further embodiment of this invention relates to a process for producing naphthalene which comprises reacting an ethylbenzene at a temperature of from about 525° to about 700° C. in the presence of a synthetically prepared catalyst comprising silica and a member selected from the group consisting of alumina, thoria, and zirconia.

Suitable charging stocks for my process comprise a benzene hydrocarbon capable of forming a more-highly ethylated benzene hydrocarbon in the process. These charging stocks include benzene and ethylene, an ethylbenzene and ethylene, and an ethylbenzene, or hydrocarbon fractions containing these hydrocarbons. The preferred ethylbenzenes are mono-ethylbenzene and ortho-diethylbenzene. When an ethylbenzene is employed it may be charged to the process from an outside source or it may be formed in the process by interaction of benzene and ethylene.

Catalysts utilizable in my process for producing naphthalene hydrocarbons comprise composites of synthetically prepared silica and an oxide selected from the group consisting of aluminum oxide, thorium oxide, and zirconium oxide.

These catalytic materials may be utilized in the form of powder, granules, or shaped particles, such as pellets or spheres, the latter formed by suitable pelleting or other shaping operations. In producing naphthalene, a hydrocarbon charging stock as mentioned above is contacted with the catalyst at a temperature of from about 525° to about 700° C. and at a pressure of from subatmospheric to about 30 atmospheres. The benzene hydrocarbon such as ethylbenzene which is treated in my process is charged at a rate corresponding to an hourly liquid space velocity of from about 0.1 to about 3.0.

When employing catalysts in the form of solid particles they may be utilized in the form of fixed masses or they may be contacted with the reactant material in the so-called fluidized or moving bed types of processes.

In order that the invention may be more clearly understood, reference is made to the accompanying diagrammatic drawing which illustrates the process of my invention in one of its more specific modifications.

As indicated in the drawing, benzene is introduced through line 1, is commingled with ethylene in line 2, and then directed into conversion zone 3. In this conversion zone, the reaction mixture is contacted with a suitable catalyst, such as heretofore mentioned, under controlled conditions of temperature, pressure, and reaction time. The reaction products which comprise naphthalene, ethylbenzene, and unconverted benzene and ethylene are directed through line 4 to separation zone 5. From separation zone 5, any unconverted ethylene and benzene are removed and returned by means of line 6 to the conversion zone. Also ethylbenzene formed in the process and not converted into naphthalene may be recycled through lines 6, 1, and 2 to further treatment in zone 3.

If desired, additional ethylene and ethylbenzene may be added to the recycle stream of ethylbenzene in order to form diethylbenzene which may be subjected to dehydrocyclization to form additional naphthalene. The reaction product containing naphthalene is removed from separation zone 5 through line 7 and is directed to purification zone 8 wherein it may be subjected to steam distillation and/or sublimation, or to other suitable means of purification to yield a purified naphthalene fraction which is removed through line 9 to storage.

The following examples are included to illustrate the operation of my process although they are not to be construed to limit unduly the broad scope of the invention.

Example I

Equimolecular proportions of benzene and ethylene are passed at atmospheric pressure through a reactor containing a silica-alumina catalyst maintained at a temperature of 550° C. When the benzene is charged at an average hourly liquid space velocity of 0.2, the yield of naphthalene is 40% based upon the weight of the benzene charged to the process.

*Example II*

Ethylbenzene was reacted in the presence of a silica-alumina catalyst at a temperature of 550° C., atmospheric pressure, and at an ethylbenzene charging rate corresponding to an hourly liquid space velocity of 0.2. The overall recycle yield, based upon 100 grams of ethylbenzene charged, was 15.9 grams of naphthalene.

The character of the process of the present invention and its commercial value are evident from the preceding specification and examples, although neither section is intended to limit unduly the broad scope of the invention.

I claim as my invention:

1. A process for producing naphthalene which comprises reacting a charging stock comprising essentially mono-ethylbenzene at a temperature of from about 525° to about 700° C. and a liquid hourly space velocity of from about 0.1 to about 3.0 in the presence of a synthetically prepared catalyst comprising silica and at least one metal oxide selected from the group consisting of alumina, thoria, and zirconia.

2. The process defined in claim 1 further characterized in that the catalyst comprises a synthetically prepared composite of silica and alumina.

3. The process defined in claim 1 further characterized in that the catalyst comprises a synthetically prepared composite of silica and zirconia.

4. The process defined in claim 1 further characterized in that the catalyst comprises a synthetically prepared composite of silica, alumina, and zirconia.

WILLIAM J. MATTOX.

REFERENCES CITED

The following references are of record in the file of this patent:

UNITED STATES PATENTS

| Number | Name | Date |
| --- | --- | --- |
| 2,110,833 | Mark et al. | Mar. 8, 1938 |
| 2,360,358 | Mattox | Oct. 17, 1944 |
| 2,389,445 | Mattox et al. | Nov. 20, 1945 |
| 2,395,199 | Schulze et al. | Feb. 19, 1946 |

OTHER REFERENCES

Thomas et al., J. A. C. S. 66, 1694–6.